United States Patent
Bever et al.

(10) Patent No.: US 12,224,404 B2
(45) Date of Patent: Feb. 11, 2025

(54) METHOD AND SYSTEM FOR STACKING BATTERY CELLS

(71) Applicant: Ford Global Technologies, LLC, Dearborn, MI (US)

(72) Inventors: Hannah Bever, South Lyon, MI (US); Andrew William Sherman, Commerce Township, MI (US); Paul John Bojanowski, Macomb Township, MI (US); Christopher Webber, Sterling Heights, MI (US); Carly Chmura, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 344 days.

(21) Appl. No.: 17/667,210

(22) Filed: Feb. 8, 2022

(65) Prior Publication Data

US 2023/0253630 A1 Aug. 10, 2023

(51) Int. Cl.
*H01M 10/0585* (2010.01)
*H01M 10/0525* (2010.01)

(52) U.S. Cl.
CPC ... *H01M 10/0585* (2013.01); *H01M 10/0525* (2013.01)

(58) Field of Classification Search
CPC .......... H01M 10/0525; H01M 10/0404; B65H 29/243; B65H 31/3054; B65H 31/34
See application file for complete search history.

(56) References Cited

U.S. PATENT DOCUMENTS

| | | | |
|---|---|---|---|
| 4,033,579 A * | 7/1977 | Stange | B65H 29/246 |
| | | | 271/195 |
| 4,479,300 A | 10/1984 | Savage | |
| 9,083,007 B2 | 7/2015 | Wu et al. | |
| 9,450,268 B2 | 9/2016 | Sato et al. | |
| 9,929,393 B2 | 3/2018 | Shiu et al. | |
| 10,396,401 B2 | 8/2019 | Yuhara et al. | |
| 2020/0227787 A1 | 7/2020 | Kang et al. | |
| 2022/0223919 A1 * | 7/2022 | Böhm | H01M 10/0413 |

FOREIGN PATENT DOCUMENTS

| | | | |
|---|---|---|---|
| DE | 102017216188 | 3/2019 | |
| DE | 102017216213 | 3/2019 | |
| DE | 102019204868 | 10/2020 | |
| DE | 102019205428 A1 * | 10/2020 | ............ B65H 29/40 |
| WO | WO-2023285269 A2 * | 1/2023 | |

OTHER PUBLICATIONS

Baumeister, et al., Integrated cut and place module for high productive manufacturing of lithium-ion cells, CIRP Annals—Manufacturing Technology, 2014, pp. 5-8, vol. 63, Elsevier.

* cited by examiner

*Primary Examiner* — Daniel McNally
(74) *Attorney, Agent, or Firm* — Burris Law, PLLC

(57) ABSTRACT

A system including an adapter plate, a conveyor, a separator drum, and first and second electrode drums. The conveyor is configured to move the adapter plate continuously and sequentially in a predetermined path between the separator drum to receive a respective separator sheet, the first electrode drum to receive a respective first electrode sheet, the separator drum to receive a respective separator sheet, and the second electrode drum to receive a respective second electrode sheet until a stacked battery cell includes a desired number of respective separator sheets, respective first electrode sheets, and respective second electrode sheets.

20 Claims, 10 Drawing Sheets

METHOD AND SYSTEM FOR STACKING BATTERY CELLS

FIELD

The present disclosure relates to a method and system for stacking battery cells.

BACKGROUND

The statements in this section merely provide background information related to the present disclosure and may not constitute prior art.

A second battery such as a lithium ion second battery, for example, comprises positive electrodes, negative electrodes, and a separator. The second battery is formed by superposing the positive electrodes and negative electrodes alternately such that the separator is interposed between the positive electrodes and negative electrodes. There exists a number of methods for manufacturing a second battery such as zigzag stacking and lamination stacking, for example. Such methods for manufacturing a second battery cell are costly and/or time consuming.

The cost and time related to manufacturing second batteries, among other issues related manufacturing second batteries, are addressed by the present disclosure.

SUMMARY

This section provides a general summary of the disclosure and is not a comprehensive disclosure of its full scope or all of its features.

In one form, the present disclosure provides a system for stacking a battery cell. The system comprises an adapter plate, a conveyor, a separator drum, and first and second electrode drums. The conveyor is configured to move the adapter plate in a predetermined path. The separator drum is configured to rotate to pick up a respective separator sheet and release the respective separator sheet onto the adapter plate. The first electrode drum is configured to rotate to pick up a respective first electrode sheet and release the respective first electrode sheet onto the adapter plate. The second electrode drum is configured to rotate to pick up a respective second electrode sheet and release the respective second electrode sheet onto the adapter plate. The conveyor is configured to move the adapter plate continuously and sequentially in the predetermined path between the separator drum to receive a respective separator sheet, the first electrode drum to receive a respective first electrode sheet, the separator drum to receive a respective separator sheet, and the second electrode drum to receive a respective second electrode sheet until the stacked battery cell comprises a desired number of respective separator sheets, respective first electrode sheets, and respective second electrode sheets.

In variations of the method for stacking a battery cell of the above paragraph, which may be implemented individually or in any combination: the separator drum comprises a first separator drum and a second separator drum; the separator drum, the first electrode drum, and the second electrode drum are positioned directly over the conveyor; the separator drum and the first and second electrode drums are inhibited from moving horizontally or vertically; the separator drum comprises a first cutout to receive the respective separator sheet via a vacuum suction; the first electrode drum comprises a second cutout to receive the first electrode sheet via a vacuum suction; the second electrode drum comprises a third cutout to receive the second electrode sheet via a vacuum suction; the adapter plate comprises alignment features to align the respective first electrode sheets and the respective second electrode sheets within the adapter plate; the alignment features are slots formed in the adapter plate; a lift is movably disposed within the adapter plate, the desired number of the respective separator sheets, the respective first electrode sheets, and the respective second electrode sheets are stacked on top of the lift within the adapter plate; and a control device is configured to control vertical movement of the lift within the adapter plate.

In another form, the present disclosure provides a system for stacking a plurality of battery cells. The system comprises adapter plates, a conveyor, a separator drum, and first and second electrode drums. The conveyor is configured to move the adapter plates in a predetermined path. The separator drum is configured to rotate to pick up a plurality of separator sheets and release the plurality of separator sheets onto respective adapter plates. The first electrode drum is configured to rotate to pick up a plurality of first electrode sheets and release the plurality of first electrode sheets onto respective adapter plates. The second electrode drum is configured to rotate to pick up a plurality of second electrode sheets and release the plurality of second electrode sheets onto respective adapter plates. The conveyor is configured to move each of the adapter plates continuously and sequentially in the predetermined path between the separator drum to receive a respective separator sheet, the first electrode drum to receive a respective first electrode sheet, the separator drum to receive a respective separator sheet, and the second electrode drum to receive a respective second electrode sheet until each stacked battery cell comprises a desired number of respective separator sheets, respective first electrode sheets, and respective second electrode sheets.

In yet another form, the present disclosure provides a system for stacking a battery cell. The system comprises an adapter plate and a rotary drum. The rotary drum is configured to rotate about a fixed axis and pick up respective separator sheets and respective electrode sheets from a plurality of feeding devices. The rotary drum is configured to continuously and sequentially release onto the adapter plate: a respective separator sheet, a respective first electrode sheet, a respective separator sheet, and a respective second electrode sheet until the stacked battery cell comprises a desired number of respective separator sheets, respective first electrode sheets, and respective second electrode sheets.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
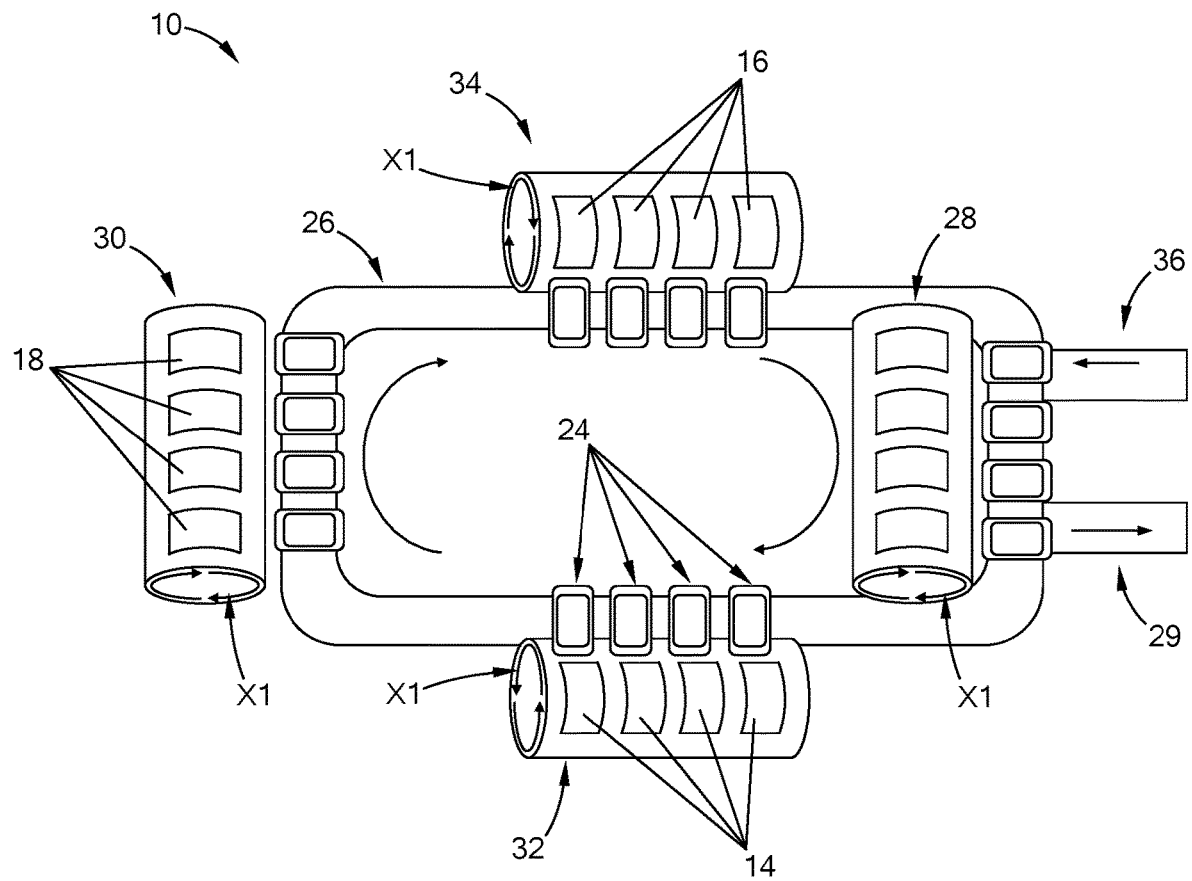
FIG. 1 is a schematic view of a system for manufacturing stacked battery cells according to the principles of the present disclosure.
Figure 2:
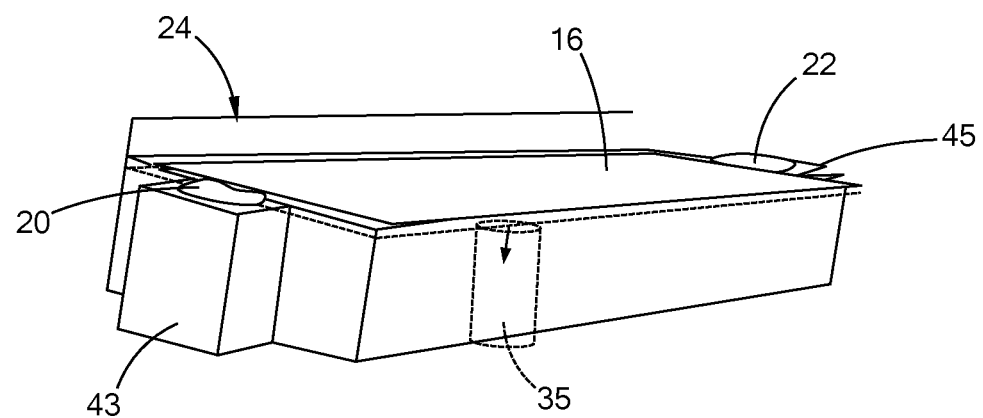
FIG. 2 is a perspective view of one adapter plate of the system of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 3A:
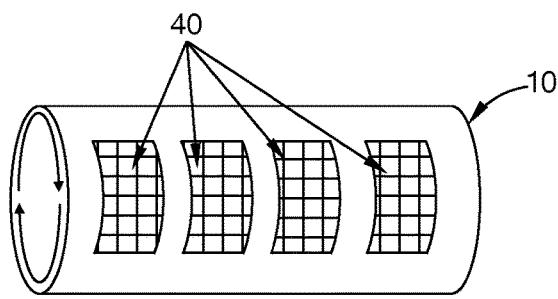
FIG. 3a is a perspective view of a first separator supply device of the system of FIG. 1.
Figure 3B:
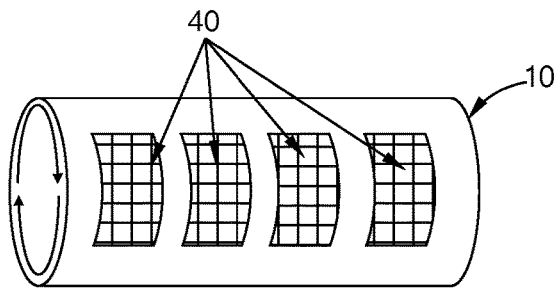
FIG. 3b is a perspective view of a second separator supply device of the system of FIG. 1.
Figure 3C:
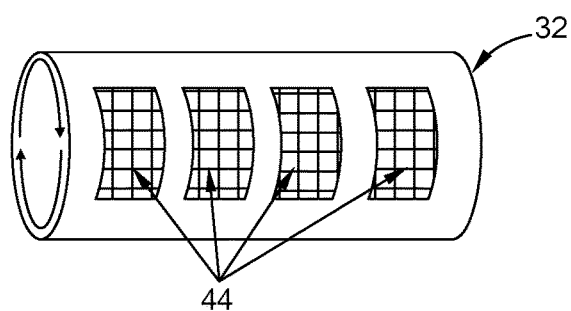
FIG. 3c is a perspective view of a first electrode supply device of the system of FIG. 1.
Figure 3D:
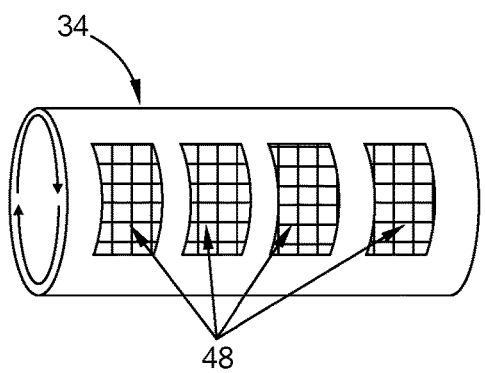
FIG. 3d is a perspective view of a second electrode supply device of the system of FIG. 1.
Figure 4A:
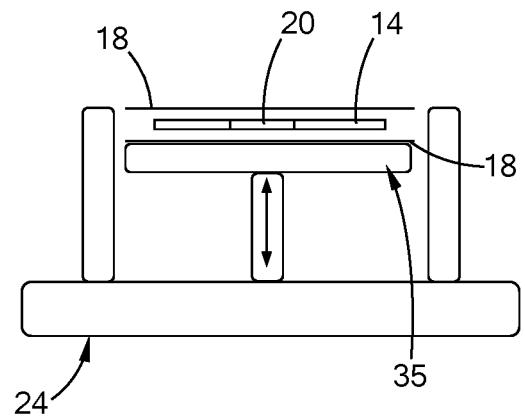
FIGS. 4a-4c are cross-sectional views of one stacked battery being gradually formed on an adapter plate of the system of FIG. 1.
Figure 4B:
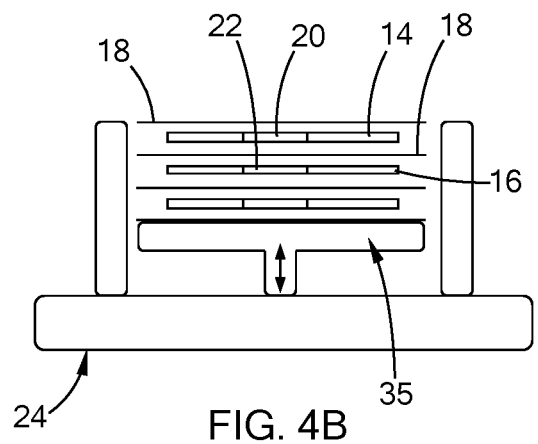
Figure 4C:
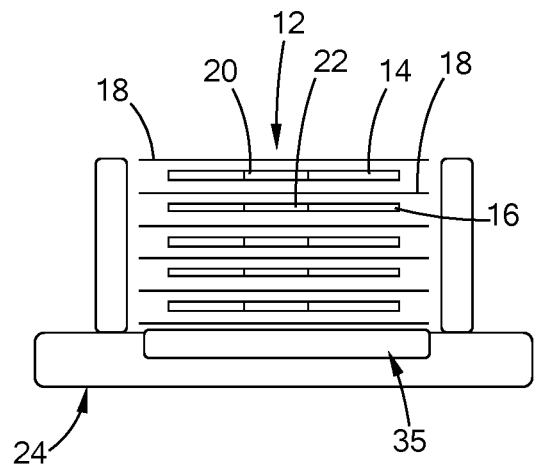

With reference to FIGS. 1-4, a system 10 (FIG. 1) is provided for manufacturing a plurality of stacked battery cells 12 (FIG. 4c). Each stacked battery cell 12 has a plurality of first electrodes 14, a plurality of second electrodes 16, and a plurality of separator sheets 18 interposed between adjacent first and second electrodes 14, 16. The plurality of first electrodes 14 and the plurality of second electrodes 16 are stacked in an alternating arrangement. Each first electrode 14 is made of a single, separate electrode sheet having opposing ends. Each first electrode 14 also comprises a foil tab 20 extending from at least one of the opposing ends. Each second electrode 16 is made of a single, separate electrode sheet having opposing ends. Each second electrode 16 also comprises a foil tab 22 extending from at least one of the opposing ends. The foil tabs 20 of the first electrodes 14 may be bundled to each other and connected to a first electrode terminal (not shown). Similarly, the foil tabs 22 of the second electrodes 16 may be bundled to each other and connected to a second electrode terminal (not shown). Each separator sheet 18 is made of a single, separate sheet.

The system 10 for manufacturing the stacked battery cells 12 comprises a plurality of adapter plates 24, a conveyor 26, first and second separator supply devices 28, 30, a first electrode supply device 32, and a second electrode supply device 34. Each stacked battery cell 12 is stacked on a lift 35 movably disposed within the respective adapter plate 24. The conveyor 26 is configured to continuously move the adapter plates 24 in a generally circular path between the supply devices 28, 30, 32, 34 until the stacked battery cells 12 comprise a desired number of respective separator sheets 18, respective first electrode sheets 14, and respective second electrode sheets 16. The conveyor 26 can be a belt driven conveyor, a roller conveyor, or any other suitable conveyor that can continuously move the adapter plates 24 in a generally circular path. The adapter plates 24 are moved onto the conveyor 26 by a conveyor feed device 36 (FIG. 1). Once the stacked battery cells 12 comprise the desired number of respective separator sheets 18, respective first electrode sheets 14, and respective second electrode sheets 16, the adapter plates 24 are removed from the conveyor 26 by a conveyor removal device 29 (FIG. 1) where the stacked battery cells 12 are transported to another workstation.

With reference to FIGS. 1, 3a, and 3b, each of the first and second separator supply devices 28, 30 is a rotary drum that is configured to continuously rotate in a first rotational direction X1 to pick up a plurality of separator sheets 18 and release the plurality of separator sheets 18 onto the lifts 35 of respective adapter plates 24 as the conveyor 26 moves the respective adapter plates 24 in a generally circular path. That is, each of the first and second separator supply devices 28, 30 picks up the separator sheets 18 from one or more feeding devices (not shown) via vacuum suction, for example, at a first position along a rotary path and releases the separator sheets 18 onto the lifts 35 of the respective adapter plates 24 at a second position along the rotary path. The first and second separator supply devices 28, 30 are positioned directly over the conveyor 26 and are inhibited from moving in a horizontal direction or vertical direction. In the example illustrated, each of the first and second separator supply devices 28, 30 comprises a plurality of rectangular cutouts 40 (FIGS. 3a and 3b) that are aligned with each other along a length of the device 28, 30. In this way, each separator sheet 18 is received in a respective cutout 40 when the separator device 28, 30 picks up the separator sheet 18 and is removed from the respective cutout 40 onto the lift 35 of the respective adapter plate 24 when the separator device 28, 30 releases the separator sheet 18. In the example illustrated, the first and separator supply devices 28, 30 are opposed to each other or between the first and second electrode supply devices 32, 34.

With reference to FIGS. 1 and 3c, the first electrode supply device 32 is a rotary drum that is configured to continuously rotate in a first rotational direction X1 to pick up the plurality of first electrodes 14 and release the plurality of first electrodes 14 onto lifts 35 of respective adapter plates 24 as the conveyor 26 moves the respective adapter plates 24 in a generally circular path. That is, the first electrode supply device 32 picks up the first electrodes 14 from one or more feeding devices (not shown) via vacuum suction, for example, at a first position along a rotary path and releases the first electrodes 14 onto the lifts 35 of the respective adapter plates 24 at a second position along the rotary path. Each adapter plate 24 comprises a first alignment feature 43 (FIG. 2) at a first end that is configured to receive foil tabs 20 of the first electrodes 14. In this way, the first electrodes 14 are aligned within the adapter plates 24. In the example illustrated, the first alignment feature 43 forms a slot that receives the foil tabs 20. The first electrode supply device 32 is positioned directly over the conveyor 26 and is inhibited from moving in a horizontal direction or vertical direction. In the example illustrated, the first electrode supply device 32 comprises a plurality of rectangular cutouts 44 (FIG. 3c) that are aligned with each other along a length of the device 32. In this way, each first electrode 14 is received in a respective cutout 44 when the first electrode supply device 32 picks up the first electrode 14 and is removed from the respective cutout 44 onto the lift 35 of the respective adapter plate 24 when the first electrode supply device 32 releases the first electrode 14.

With reference to FIGS. 1 and 3d, the second electrode supply device 34 is a rotary drum that is configured to continuously rotate in a first rotational direction X1 to pick up the plurality of second electrodes 16 and release the plurality of second electrodes 16 onto the lifts 35 of respective adapter plates 24 as the conveyor 26 moves the respective adapter plates 24 in a generally circular path. That is, the second electrode supply device 34 picks up the second electrodes 16 from one or more feeding devices (not shown) via vacuum suction, for example, at a first position along a rotary path and releases the second electrodes 16 onto the lifts 35 of the respective adapter plates 24 at a second position along the rotary path. Each adapter plate 24 comprises a second alignment feature 45 (FIG. 2) at a second end that opposes the first end that receives foil tabs 22 of the second electrodes 16. In this way, the second electrodes 16 are aligned within the adapter plates 24. In the example illustrated, the second alignment feature 45 forms a slot that receives the foil tabs 22. The second electrode supply device 34 is positioned directly over the conveyor 26 and is inhibited from moving in a horizontal direction or vertical direction. In the example illustrated, the second electrode supply device 34 comprises a plurality of rectangular cutouts 48 (FIG. 3d) that are aligned with each other along a length of the device 34. In this way, each second electrode 16 is received in a respective cutout 48 when the second electrode supply device 34 picks up the second electrode 16 and is removed from the respective cutout 48 onto the lift 35 of the respective adapter plate 24 when the second electrode supply device 34 releases the second electrode 16. Each of the supply devices 28, 30, 32, 34 rotate about a fixed axis. Each of the supply devices 28, 30, 32, 34 may also rotate at a speed between one in a half (1.5)-five (5) meters per second.

Figure 5:
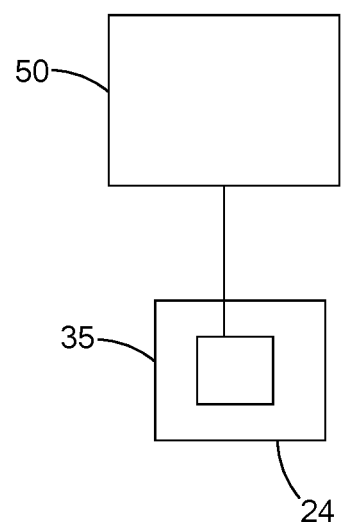
FIG. 5 is a schematic block diagram showing components of the system of FIG. 1.
Figure 6:
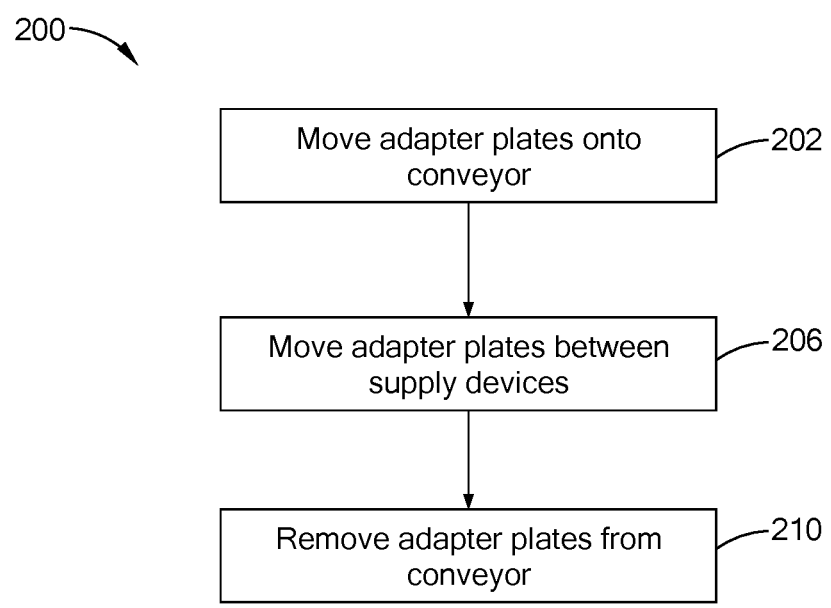
FIG. 6 is a flow chart illustrating a method for stacking a battery cell in accordance with the teachings of the present disclosure.

With continued reference to FIGS. 5 and 6, a method 200 for manufacturing stacked battery cells 12 using the system 10 will be described in detail. First, at 202, the adapter plates 24 are moved onto the conveyor 26 by the conveyor feed device 36. Then, at 206, the conveyor 26 moves each of the adapter plates 24 continuously and sequentially between the first separator supply device 28 to receive a respective separator sheet 18, the first electrode supply device 32 to receive a respective first electrode sheet 14, the second separator supply device 30 to receive a respective separator sheet 18, and the second electrode supply device 34 to receive a respective second electrode sheet 16 until each stacked battery cell 12 comprises a desired number of respective separator sheets 18, respective first electrode sheets 14, and respective second electrode sheets 16. It should be understood that the lifts 35 of the adapter plates 24 gradually move downwardly in a vertical direction as the sheets 14, 16, 18 are disposed thereon. That is, as shown in FIG. 5, a control device 50 is in communication with the lifts 35 of the adapter plates 24 and is configured to control the vertical movement of the lifts 35. The control device 50 is a servo driven controller or a pneumatic driven controller, for example. Lastly, at 210, the adapter plates 24 comprising the stacked battery cells 12 are removed from the conveyor 26 by the conveyor removal device 29 and moved to the next workstation.

Figure 7:
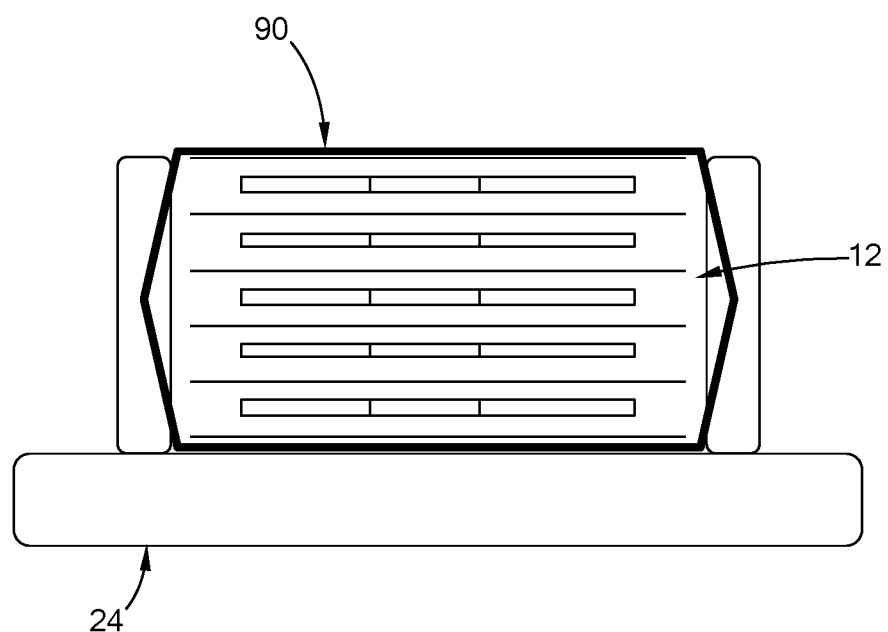
FIG. 7 is a cross-sectional view of a stacked battery cell in a pouch within an adapter plate.

It should be understood that, in some examples, as shown in FIG. 7, each stacked battery cell 12 may be stacked in a pouch 90 disposed within the adapter plate 24. The pouch 90 may be made of a material comprising nylon, mylar and/or aluminum. The pouch 90 is sealed from the top when the stacked battery cell 12 comprises the desired number of respective separator sheets 18, respective first electrode sheets 14, and respective second electrode sheets 16.

The first electrodes 14 described above are negative electrodes and the second electrodes 16 described above are positive electrodes. However, it should be understood that the first electrodes 14 may be positive electrodes and the second electrodes 16 may be negative electrodes without departing from the scope of the present disclosure.

The method and system described in the present disclosure can be used for lithium-ion battery pouch cells, prismatic cells, wound cells, uni-polar or bi-polar cells, and solid state batteries, for example. The method and system of the present disclosure provides the benefit of reducing manufacturing time of the stacked battery cell 12.

Figure 8:
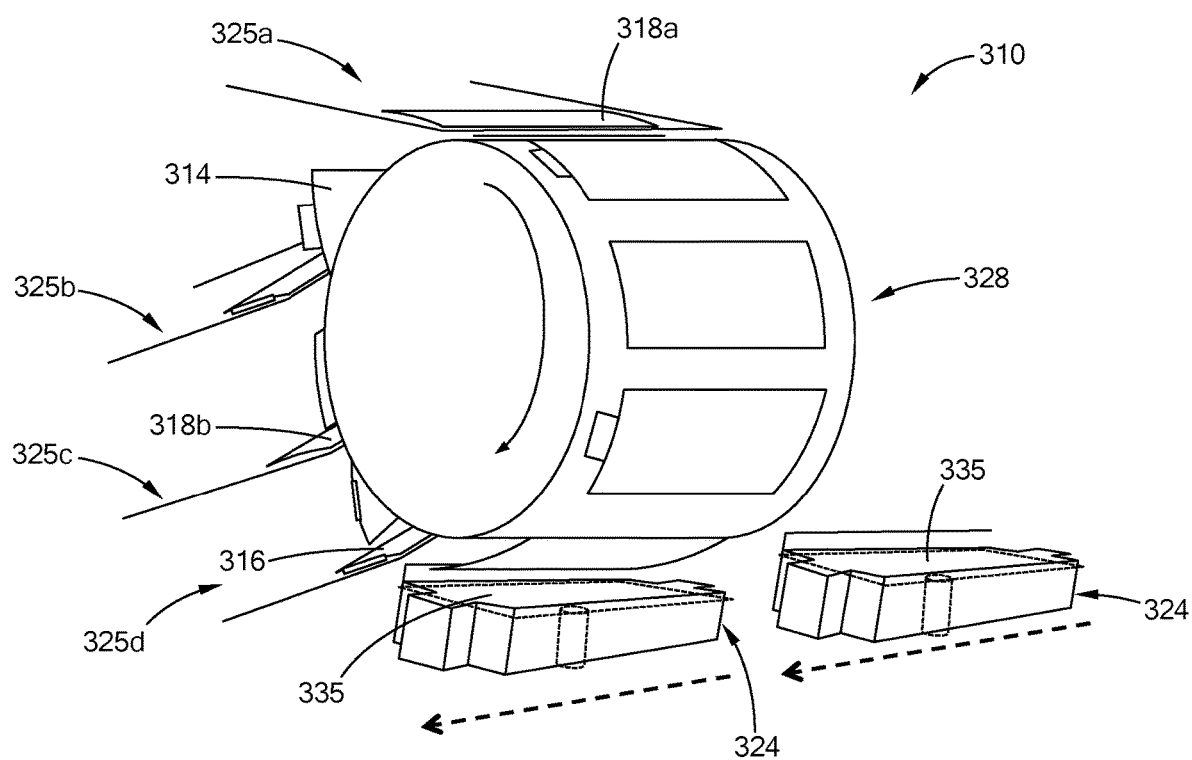
FIG. 8 is a perspective view of a supply device of another system for manufacturing stacked battery cells according to the principles of the present disclosure.

With continued reference to FIG. 8, another system 310 is provided for manufacturing a plurality of stacked battery cells. The system 310 may be similar or identical to the system 10 described above, apart from any exception noted below.

The system 310 comprises a plurality of adapter plates 324, a conveyor (not shown), sheet feeding conveyors 325a, 325b, 325c, 325c and a supply device 328. The adapter plates 324 are similar or identical to the adapter plates 24 described above, and therefore, will not be described again in detail. The conveyor is configured to move the adapter plates 324 along a path (e.g., linear or circular path) to the supply device 328 such that the stacked battery cell is stacked thereon.

The sheet feeding conveyor 325a is configured to feed a first separator sheet 318a to the supply device 328, the sheet feeding conveyor 325b is configured to feed a first electrode sheet 314 to the supply device 328, the sheet feeding conveyor 325c is configured to feed a second separator sheet 318b to the supply device 328, and the sheet feeding conveyor 325d is configured to feed a second electrode sheet 316 to the supply device 328.

The supply device 328 is a rotary drum that is configured to continuously rotate in a first rotational direction to pick up respective sheets 314, 316, 318a, 318b and release the respective sheets 314, 316, 318a, 318b one at a time onto a lift 335 of a respective adapter plate 324. That is, the supply device 328 picks up the respective sheets 314, 316, 318a, 318b from the feeding devices 325a, 325b, 325c, 325d via vacuum suction, for example, and releases the respective sheets 314, 316, 318a, 318b onto the lift 335 of the respective adapter plate 24. The supply device 328 is positioned directly over the conveyor and is inhibited from moving in a horizontal direction or vertical direction. The supply device 328 comprises a plurality of rectangular cutouts (not shown) that are formed in the supply device 328 and aligned with each other around the supply device 328. In this way, the sheets 314, 316, 318a, 318b are received in a respective cutout when the supply device 328 picks up the sheets 314, 316, 318a, 318b and are removed from the respective cutout onto the lift 335 of the respective adapter plate 324 when the supply device 328 releases the sheets 314, 316, 318a, 318b. The supply device 328 continuously releases sheets 314, 316, 318a, 318b onto the lift 335 of the respective adapter plate 324 until the stacked battery cell comprises a desired number of respective separator sheets 318a, 318b, respective first electrode sheets 314, and respective second electrode sheets 316. The sheets 314, 316, 318a, 318b are continuously released sequentially in the following order: a respective separator sheet 318a, a respective first electrode sheet 314, a respective separator sheet 318b, and a respective second electrode sheet 316. A control device (not shown) is configured to gradually move the lift 335 downwardly in a vertical direction as the sheets 314, 316, 318a, 318b are disposed thereon. Once the stacked battery cell is stacked, the conveyor moves the adapter plate 324 comprising the stacked battery cell to the next workstation and another adapter plate 324 is positioned under the supply device 328. The supply device 328 may rotate at a predetermined speed based on the number of cutouts formed in the supply device 328. In one example, the rotational speed may be between one in a half (1.5)-five (5) meters per second.

It should be understood that, in some configurations, the feeding device 325c may be removed from the system 310 such that the system 310 includes only one feeding device 325a. In this way, the sheets 314, 316, 318a are continuously released sequentially by the supply device 328 in the following order: a respective separator sheet 318a, a respective first electrode sheet 314, a respective separator sheet 318a, and a respective second electrode sheet 316.

Figure 9:
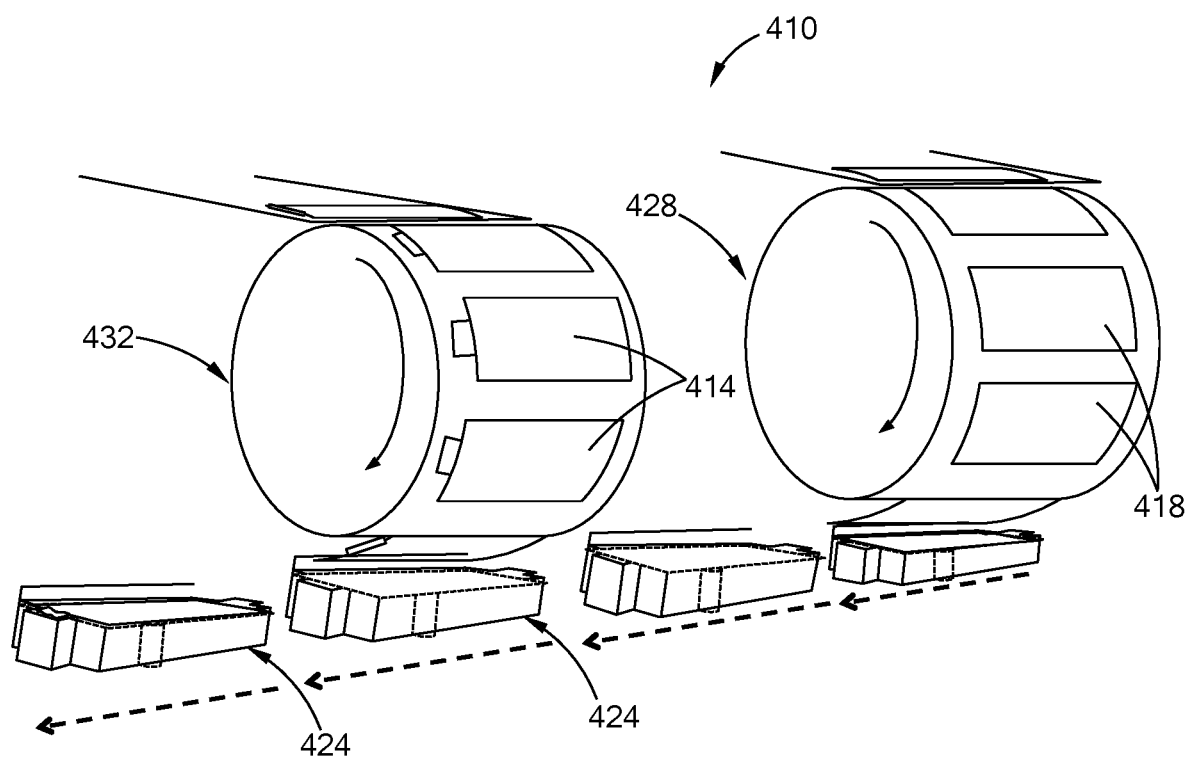
FIG. 9 is a perspective view of a first separator supply device and a first electrode supply device of yet another system for manufacturing stacked battery cells according to the principles of the present disclosure.
Figure 10:
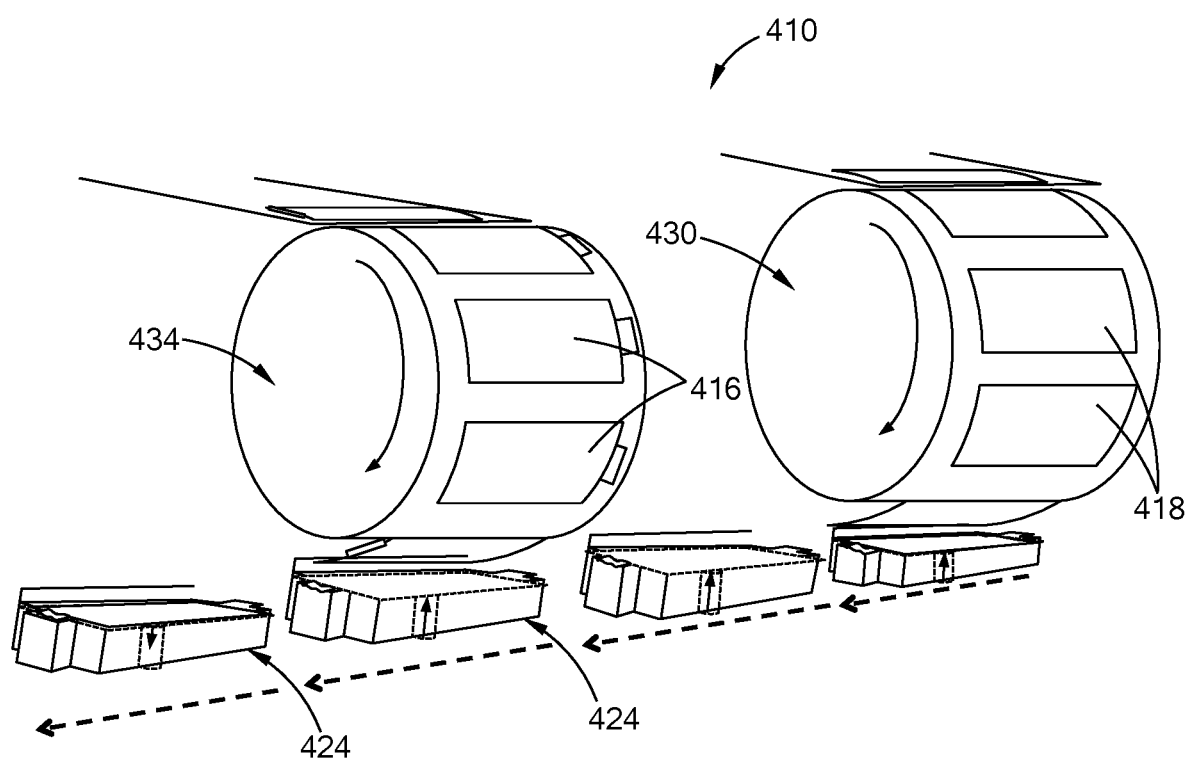
FIG. 10 is a perspective view of a second separator supply device and a second electrode supply device of the system of FIG. 9.

With continued reference to FIGS. 9 and 10, another system 410 is provided for manufacturing a plurality of stacked battery cells. The system 410 may be similar or identical to the systems 10, 310 described above, apart from any exception noted below.

The system 410 for manufacturing the stacked battery cells comprises a plurality of adapter plates 424, a conveyor (not shown), first and second separator supply devices 428, 430, a first electrode supply device 432, and a second electrode supply device 434. The adapter plates 424 are similar or identical to the adapter plates 24, 324 described above, and therefore, will not be described again in detail. The conveyor is configured to move the adapter plates 424 along a generally circular path between the supply devices 428, 430, 432, 434.

The first and second separator supply devices 428, 430 are rotary drums that are configured to continuously rotate in a first rotational direction to pick up respective separator sheets 418 and release the respective sheets 418 onto a respective adapter plate 424. The first and second separator supply devices 428, 430 comprise a plurality of rectangular cutouts (not shown) that are formed in the supply devices 428, 430 and are aligned with each other around the first and second separator supply devices 428, 430.

The first electrode supply device 432 is a rotary drum that is configured to continuously rotate in a first rotational direction to pick up respective first electrode sheets 414 and release the respective sheets 414 onto a respective adapter plate 424. The first electrode supply device 432 comprises a plurality of rectangular cutouts (not shown) that are formed in the first electrode supply device 432 and are aligned with each other around the first electrode supply device 432. The second electrode supply device 434 is a rotary drum that is configured to continuously rotate in a first rotational direction to pick up respective second electrode sheets 416 and release the respective sheets 416 onto a respective adapter plate 424. The second electrode supply device 434 comprises a plurality of rectangular cutouts (not shown) that are formed in the second electrode supply device 434 and are aligned with each other around the second electrode supply device 434.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for stacking a battery cell, the system comprising:
    an adapter plate;
    a conveyor configured to move the adapter plate in a predetermined path;
    a separator drum configured to rotate about a first rotational axis to pick up a respective separator sheet and release the respective separator sheet onto the adapter plate;
    a first electrode drum configured to rotate about a second rotational axis to pick up a respective first electrode sheet and release the respective first electrode sheet onto the adapter plate, the first rotational axis extending non-parallel to the second rotational axis; and
    a second electrode drum configured to rotate to pick up a respective second electrode sheet and release the respective second electrode sheet onto the adapter plate, wherein the conveyor is configured to move the adapter plate continuously and sequentially in the predetermined path between the separator drum to receive a respective separator sheet, the first electrode drum to receive a respective first electrode sheet, the separator drum to receive a respective separator sheet, and the second electrode drum to receive a respective second electrode sheet until a stacked battery cell comprises a desired number of respective separator sheets, respective first electrode sheets, and respective second electrode sheets.

2. The system of claim 1, wherein the separator drum comprises a first cutout to receive the respective separator sheet via a vacuum suction.

3. The system of claim 2, wherein the first electrode drum comprises a second cutout to receive the first electrode sheet via a vacuum suction.

4. The system of claim 3, wherein the second electrode drum comprises a third cutout to receive the second electrode sheet via a vacuum suction.

5. The system of claim 1, further comprising a lift movably disposed within the adapter plate, the desired number of the respective separator sheets, the respective first electrode sheets, and the respective second electrode sheets are stacked on top of the lift within the adapter plate.

6. The system of claim 5, further comprising a control device configured to control vertical movement of the lift within the adapter plate.

7. The system of claim 6, wherein the control device is a servomechanism.

8. The system of claim 1, wherein the adapter plate comprises alignment features to align the respective first electrode sheets and the respective second electrode sheets within the adapter plate.

9. The system of claim 8, wherein the alignment features are slots formed in the adapter plate.

10. The system of claim 1, wherein the separator drum comprises a first separator drum and a second separator drum.

11. The system of claim 1, wherein the separator drum, the first electrode drum, and the second electrode drum are positioned directly over the conveyor.

12. The system of claim 1, wherein the separator drum and the first and second electrode drums are inhibited from moving horizontally or vertically.

13. A system for stacking a plurality of battery cells, the system comprising:
a plurality of adapter plates;
a conveyor configured to move the adapter plates in a predetermined path;
a separator drum configured to rotate about a first rotational axis to pick up a plurality of separator sheets and release the plurality of separator sheets onto respective adapter plates;
a first electrode drum configured to rotate about a second rotational axis to pick up a plurality of first electrode sheets and release the plurality of first electrode sheets onto respective adapter plates, the first rotational axis extending non-parallel to the second rotational axis; and
a second electrode drum configured to rotate to pick up a plurality of second electrode sheets and release the plurality of second electrode sheets onto respective adapter plates,
wherein the conveyor is configured to move each of the adapter plates continuously and sequentially in the predetermined path between the separator drum to receive a respective separator sheet, the first electrode drum to receive a respective first electrode sheet, the separator drum to receive a respective separator sheet, and the second electrode drum to receive a respective second electrode sheet until each stacked battery cell comprises a desired number of respective separator sheets, respective first electrode sheets, and respective second electrode sheets.

14. The system of claim 13, wherein the separator drum comprises a plurality of first cutouts to receive the respective separator sheets via a vacuum suction.

15. The system of claim 14, wherein the first electrode drum comprises a plurality of second cutouts to receive the first electrode sheets via a vacuum suction.

16. The system of claim 15, wherein the second electrode drum comprises a plurality of third cutouts to receive the second electrode sheets via a vacuum suction.

17. The system of claim 13, wherein the separator drum comprises a first separator drum and a second separator drum.

18. The system of claim 13, wherein the separator drum, the first electrode drum, and the second electrode drum are positioned directly over the conveyor.

19. The system of claim 13, wherein the separator drum and the first and second electrode drums are inhibited from moving horizontally or vertically.

20. A system for stacking a battery cell, the system comprising:
an adapter plate; and
a rotary drum configured to rotate about a fixed axis and pick up respective separator sheets and respective electrode sheets from a plurality of feeding devices, the rotary drum defining at least one cutout extending along a circumference of the rotary drum such that the respective separator sheets and the respective electrode sheets extend along a circumference of the rotary drum when the rotary drum picks up the respective separator sheets and the respective electrode sheets,
wherein the rotary drum is configured to continuously and sequentially release onto the adapter plate: a respective separator sheet, a respective first electrode sheet, a respective separator sheet, and a respective second electrode sheet until a stacked battery cell comprises a desired number of respective separator sheets, respective first electrode sheets, and respective second electrode sheets.

* * * * *